United States Patent [19]
Caradec

[11] 4,014,080
[45] Mar. 29, 1977

[54] DEVICE FOR AUTOMATICALLY SEPARATING TWO SECTIONS OF A STRAP

[76] Inventor: Alain Caradec, 183, Rue Paradis, 13006 Marseille, France

[22] Filed: Mar. 13, 1975

[21] Appl. No.: 558,152

[30] Foreign Application Priority Data

Mar. 20, 1974 France .............................. 74.09501
Jan. 28, 1975 France .............................. 75.02584

[52] U.S. Cl. .................. 24/230 R; 24/DIG. 30; 280/744
[51] Int. Cl.² ........................................ A44B 11/00
[58] Field of Search .... 24/230 R, 230 SL, DIG. 30; 297/385; 280/150 SB

[56] References Cited

UNITED STATES PATENTS

| 3,142,102 | 7/1964 | Saunders | 24/DIG. 30 |
| 3,228,080 | 1/1966 | Trauger | 24/DIG. 30 |
| 3,314,088 | 4/1967 | Nordhaus et al. | 24/DIG. 30 |
| 3,500,510 | 3/1970 | Gaione | 24/DIG. 30 |

FOREIGN PATENTS OR APPLICATIONS

| 1,565,373 | 3/1969 | France | |
| 83,582 | 7/1964 | France | 24/DIG. 30 |
| 2,136,406 | 2/1973 | Germany | |

Primary Examiner—James T. McCall
Assistant Examiner—Robert W. Gibson, Jr.
Attorney, Agent, or Firm—Brisebois & Kruger

[57] ABSTRACT

Device for automatically separating two sections of a strap in response to heat or the presence of water comprises a box connected to an end of each section, one end being connected by catch means spring-biased toward its open position, but blocked against movement to the open position by a tablet which disintegrates in response to heat or water.

6 Claims, 3 Drawing Figures

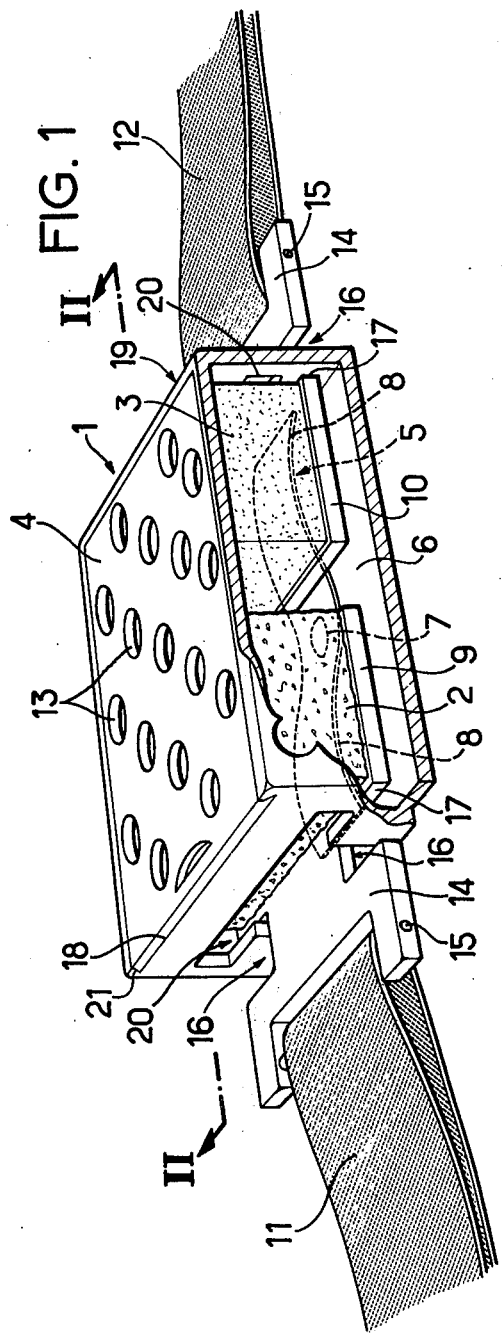
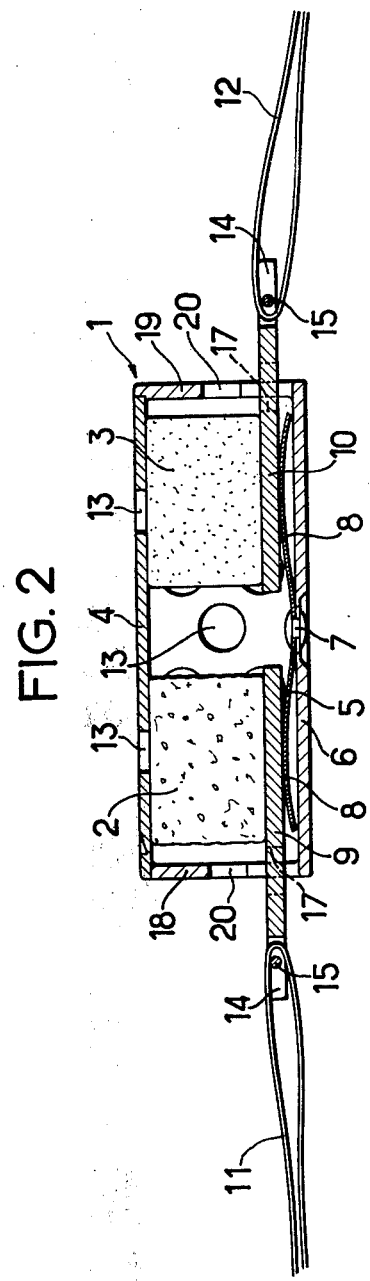

DEVICE FOR AUTOMATICALLY SEPARATING TWO SECTIONS OF A STRAP

SUMMARY OF THE INVENTION

This invention relates to a device for automatically separating two segments of a strap, for example a safety belt, when exposed to abnormally high heat or immersed in a liquid.

This device may serve a number of purposes, especially when applied to the safety belts with which certain vehicles, especially automobiles, are equipped.

In many countries it is obligatory for the passengers in the front seat of an automobile to wear a seat belt. However, many passengers still hesitate to buckle the belts which are available to them. In effect, in case of accident, if the vehicle catches fire or is immersed in water, the users fear that they will not be able to get out of the damaged vehicle rapidly, particularly if they are injured, if they temporarily lose consciousness, or simply because of the fright which results from the shock of such an accident. The arrangement described in the present invention makes it possible to automatically separate two segments which are connected together and, in particular, automatically disconnects a seat belt equipped with the device in question when the vehicle to which the belt is attached takes fire or is immersed in a liquid.

In order to obtain this result a box is positioned between the two segments of a seat belt. At least one of the sides of this box has an opening for the automatic release of at least one of the seat belt segments. This box contains at least one tablet and a spring so positioned that at least one of the ends of one of the segments of a seat belt is gripped between the tablet and a spring. The tablet is made of a material which disintegrates when heated and/or in a liquid. When the vehicle takes fire or is immersed, the tablet disintegrates, which has the effect of lifting the end of one of the segments of the seat belt, for example, in response to the action of a spring. The lifting of this attachment permits the latter to escape through an opening having an appropriate shape formed in the box containing the tablet. The opening of the seat belt thus takes place automatically without any necessity for the user to take any action whatsoever to release himself.

The device according to the present invention may be mounted at any point on a seat belt in an automotive vehicle and for this reason may be annoying to the user of such a belt. It is for this reason that another object of the present invention is to provide a device serving the above described purpose but which, because of its construction, may be installed in an appropriate place inside the automotive vehicle, and especially in a place which will in no way bother the users of the vehicle.

In one embodiment of the invention the device makes it possible to automatically release one of the segments of a seat belt and is advantageously located in a box which may be attached in a conventional manner to one of the components of an automotive vehicle out of the way of its occupants.

According to a preferred embodiment of the invention one end of a seat belt segment is engaged inside the box containing one or more tablets which react either to heat or to humidity. This box has a slot for this purpose in one of its sides. The end has a hole pierced by a projection fixed to a plate situated inside the box. This plate is pivotally mounted on or near the opposite side of the box. This plate is gripped between the tablet or tablets which are capable of disintegrating in the presence of heat or humidity and a spring, so that when one or the other of the tablets disintegrates the spring automatically lifts the plate, the projection attached to the plate comes out of the hole, and this results in the liberation of the segment of the seat belt.

In order that the end may be released from the box when the projection is released, the slot has dimensions equal to or slightly greater than the dimensions of the end, which avoids any squeezing when the tablet or tablets which hold the plate, and consequently the projection which passes through the end of the belt segment disintegrate.

In order that the projection from the plate may operate under optimum conditions the bottom of the box is advantageously provided with a hole so that when the tablet and the segment end are located in the box, the projection attached to the plate passes through both the segment end and the bottom of the box. In this way, the force exerted by the segment end on the projection is balanced on both sides of the attachment by the bottom of the box and by the pivoted plate inside the box.

Finally, in order to facilitate the disintegration of the tablets inside the box in case of accident, the walls of the latter are preferably provided with orifices. These permit either heat or liquid in which the vehicle has been immersed to act more rapidly on one or the other of the tablets.

The tablet sensitive to heat may also be replaced in an advantageous embodiment by an ampoule containing a fluid under pressure having a high coefficient of expansion. In the case of an abnormal increase in temperature this fluid expands and explodes the ampoule, which thus releases one or the other of the segments of the seat belt in the same way as hereinbefore described.

In order to protect the device according to the invention from too much heat, which may be produced inside the vehicle because of its exposure to the sun, a protective chamber may be provided in which the safety device is located. This protective chamber prevents the tablets sensitive to heat from disintegrating and automatically releasing one of the segments of the seat belt at an inopportune moment.

Other features of the present invention will become apparent from the following description of a preferred embodiment thereof, given purely by way of illustration and example, with reference to the accompanying drawing, in which:

FIG. 1 is a perspective view of a device according to the invention;

FIG. 2 is a sectional view taken along the line II—II of FIG. 1; and

Figure 3:
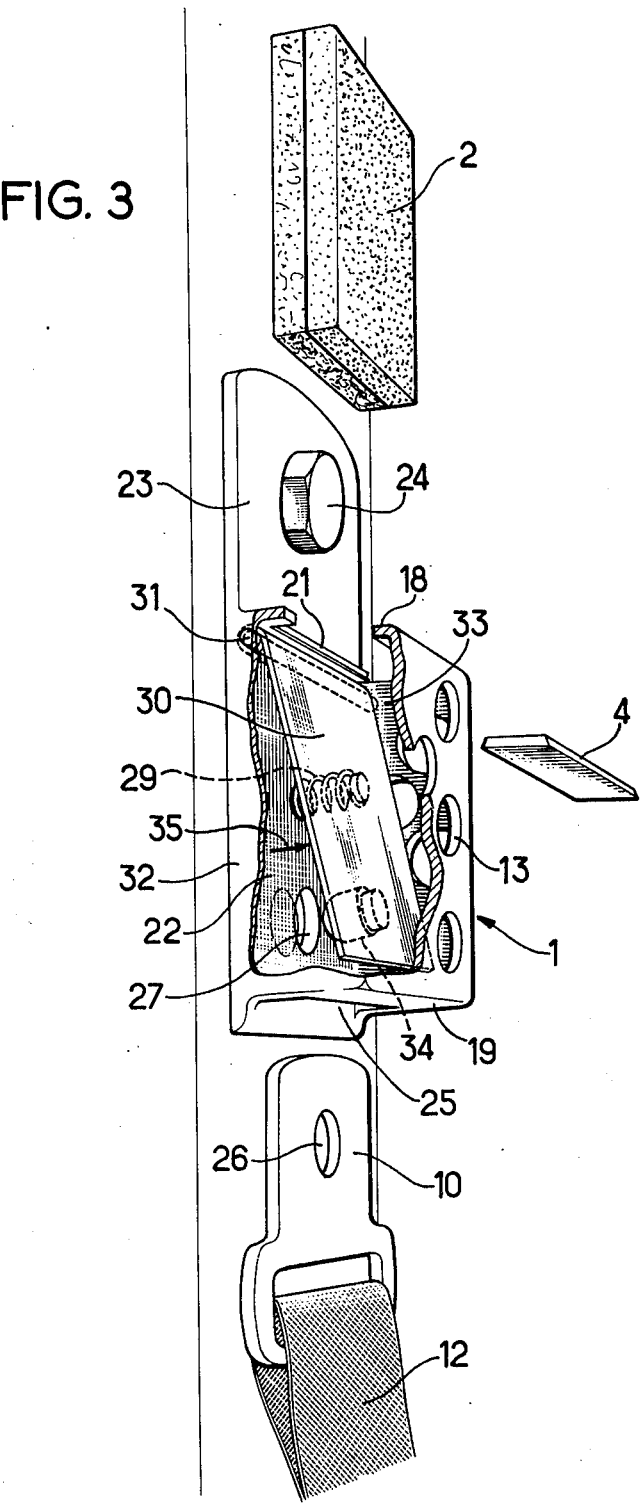
FIG. 3 is a perspective view of a second embodiment of the device according to the invention.

As shown in FIG. 1, the device according to the invention comprises a box 1, which is preferably made of a material which is a good conductor of heat. Two tablets 2 and 3 are located in this box. One of these is adapted to disintegrate when heated to a predetermined temperature, while the other is adapted to disintegrate in a liquid, that is to say, at a certain degree of humidity. These two tablets 2 and 3 are positioned one beside the other with one surface bearing against the upper surface 4 of the box 1 and urged thereagainst by the leaf spring 5 attached to the lower surface 6 of the box 1 opposite its upper surface 4. The leaf spring 5 is located substantially in the middle of the lower surface 6 of the box 1 by a rivet 7 or any other suitable means. Between the spring 5, comprising two arms 8, and the base of the tablets 2 and 3, are gripped the ends 9 and 10 of the belts 11 and 12 of a seat belt.

Orifices 13 are provided in all the walls of the box 1 in order that the tablets 2 and 3 may communicate with the atmosphere around the box 1.

The ends 9 and 10 of the belt segments 11 and 12 of the seat belt each comprise a tip 14 pierced by a pin 15 permitting its connection to the segments 11 and 12. On the other hand, these ends 9 and 10 also have two notches 16, each edge 17 of which bears against the inside of the lower part of one of the walls 18 and 19 of the box 1. The notches 16 in cooperation with the walls 18 and 19 of the box 1 are adapted to absorb the tension which may be exerted on the segments 11 and 12 of the safety belt. In order to permit release of the ends 9 and 10 from the box 1 the ends 18 and 19 thereof have been provided with a slot 20 which is T-shaped. It will also be noted that the device described above has a vertical axis of symmetry (not shown) passing through the center of the top 4 and bottom 6 of the box 1. This axis also passes through the rivet 7 which serves to fasten the spring 5 to the bottom of the box 1. The apparatus according to the present invention operates in the following manner:

When the device described above is exposed to heat above a predetermined temperature or when it is in the presence of a liquid, one of the tablets 2 or 3 disintegrates, as for example when the vehicle has fallen into a lake or river, or when the vehicle has taken fire after an accident. One of the segments 8 of the spring 5 moves in the direction of the top of the box 1 and lifts one of the belt ends 9 or 10 high enough that the edges 17 of this end no longer bear on the inside of one of the ends 18 or 19 of the box 1, but are located opposite the horizontal slot in the T-shaped window 20. The belt end 9, for example, is no longer held in the box 1 connected to the other belt end 12 by the tab 10. The seat belt is thus opened and the user may then leave his seat without any other external intervention.

The top 4 of the box 1 is removable and serves as a cover permitting the replacement of one or more of the tabs 2 or 3 when it has disintegrated. For this purpose the cover 4 slides in two grooves 21 formed in the lateral sides of the box 1. Latch means not shown makes it possible to hold the cover 4 in its closed position.

It should be noted that the tablet which disintegrates in the presence of a liquid or of a high degree of humidity may, for example, be made of glucose.

The tablet which disintegrates in the presence of heat may be made, for example, from a waxy material.

Certain seat belts have winding up devices such that when the seat belt is unlocked, it is automatically wound up near its anchoring point. In order to protect the box 1 from heat, when the belt is not in service, an insulating jacket, not shown on the drawing, may be provided to receive the box 1, which is adapted to fit into this insulating enclosure. For this reason, and in the examples illustrated by FIGS. 1 and 2, the box is preferably installed immediately adjacent one of the seat belt buckles so as to avoid interfering with its being wound up.

This device may advantageously be installed in one of the buckles (not shown) of the seat belt so that the box 1 is integral therewith. An alternative embodiment of the present invention consists of providing only a single tablet and a single attachment for one of the belts in the box 1. This tablet is then adapted to disintegrate in response to either heat or immersion in a liquid, which results in a particularly humid atmosphere. The other end of the other segment of the seat belt is then connected permanently to the box 1. This device also comprises a spring urging the belt segment end engaged in the box against the composite tablet. This arrangement makes it possible for the device to function in the same way as the previously described embodiment, that is to say, when one of the parts of the tablet melts, the spring lifts the belt segment end engaged in the box provided with orifices 13 to a height sufficient to permit it to escape through the T-shaped opening 20 provided in one of the ends 18 or 19 of the box 1.

FIG. 3 shows an alternative embodiment of the device according to the invention. In this embodiment the box 1 is installed at one of the points at which a seat belt is anchored, that is to say either on the mounting of the door frame of a vehicle or on the floor of the vehicle. This latter location has the advantage of being more accessible to liquids and consequently results in more rapid operation of the device according to the invention if a vehicle so equipped falls into the water. On the other hand, the device does not project from the door frame, so that there is no risk of occasional injury if the head of the occupant is thrown against the mounting on the door frame of a vehicle thus equipped.

Moreover, the location of the device illustrated in FIG. 3, at the level of the floor of the vehicle 4, protects it from direct exposure to the sun, and thus avoids inopportune operation.

Once it has been attached to one of the anchorage points solidly fixed to the vehicle, the end 10 of one of the belt segments 12 is introduced through a rectangular slot 25 provided in the end 19 of the box 1. The slot 25 is located at the level of the bottom 22 of the box 1, and is of the anti-torsion type, that is to say that it has dimensions equal to or slightly greater than those of the end 10 introduced into the box 1. This end 10 is made from a metallic member 4.

When the end 10 provided with the hole 26 has been introduced into the box 1 so that its hole 26 is opposite a hole 27 in the bottom 22 of the box 1, a composite tablet 2 capable of reacting to heat or humidity is introduced for example through the end 18 of the box 1 opposite the one in which the slot 25 is located.

The act of introducing the composite tablet 2 into the box 1 compresses a spring 29 through a plate 30 pivotally attached for example to a pin 31 located at the level of the bottom 22 of the box 1 and located between the lateral sides 32 and 33 of the box 1. When the tablet 2 is in place in the box, the plate 30 occupies a position substantially parallel to the bottom 22 of the box 1. Under these conditions a projection 34 mounted on the plate 30 passes through the hole 26 in the end 10 of one of the segments 12 of a seat belt as well as the hole 27 in the bottom of the box 1. The force capable of being exerted on the end 10 of the safety belt may thus be balanced by the plate 30 and the bottom 22 of the box 1 situated on opposite sides of the end 10. The projection 34 thus operates like a beam loaded at its center and resting at its two ends on a support.

During the operation of the device illustrated in FIG. 3, when the tablet 2 disintegrates, the spring 29 presses the plate 30 in the direction of the space occupied by the tablet, that is to say in the direction of the arrow 35.

This has the effect of releasing the projection 34 from the hole 27 in the bottom 22 of the box 1 and the hole 26 provided in the end 10 of one of the segments 12 of the seat belt. This end 10 is then released and escapes automatically from the box 1 through the slot 25 due to its own weight, thus releasing the occupant of the vehicle which has been in an accident from any restraint. When the box 1 is installed at the level of the floor of the vehicle 4 the end 10 is not automatically released by gravity, but simple traction, encountering no resistance, will release the end 10 from the box 1 and thus release the user of the seat belt equipped with the device illustrated by FIG. 3.

The invention which has been described in the present application may be applied to the opening of seat belts but may also serve, in appropriate circumstances, to separate two straps which have been connected together, or to release the connection of a strap which has been used for stowage when the place of connection of the straps or stowage is exposed to a temperature or abnormally high humidity.

What is claimed is:

1. Device for connecting two strap sections, each of which terminates in an end member, said device being adapted to permit the automatic separation of said sections and comprising:
    a box receiving said end members;
    blocking means blocking release of each end member when said blocking means and end member are in a first position relative to each other but permitting the release of either one of said end members when said one end member and said blocking means are in a second position relative to each other;
    spring means biasing one of said end members away from said first relative position toward said second relative position; and
    two tablets, one positioned to prevent movement of each end member away from said first relative position, one of said tablets being adapted to disintegrate in response to a predetermined ambient temperature and the other in response to a predetermined degree of humidity, thereby permitting the end member associated with the disintegrated tablet to move away from said first position and be released from said box.

2. Device for connecting two strap sections, at least one of which terminates in an end member, said device being adapted to permit the automatic separation of said sections and comprising:
    a box receiving said end member;
    a blocking member blocking release of said end member when said blocking member and end member are in a first position relative to each other but permitting the release of said end member when said members are in a second position relative to each other;
    spring means biasing one of said members away from said first relative position toward said second relative position; and
    a tablet positioned to prevent movement of said one member away from said first relative position, said tablet being a composite tablet adapted to disintegrate at a given temperature and at a given degree of humidity, thereby permitting movement of said one member away from said first position and the release of said end member from said box.

3. Device for connecting two strap sections, at least one of which terminates in an end member, said device being adapted to permit the automatic separation of said sections and comprising:
    a box receiving said end member;
    a blocking member blocking release of said end member when said blocking member and end member are in a first position relative to each other but permitting the release of said end member when said members are in a second position relative to each other;
    spring means biasing one of said members away from said first relative position toward said second relative position, and
    at least one tablet positioned to prevent movement of said one member away from said first relative position, said at least one tablet being adapted to disintegrate in response to predetermined ambient conditions, thereby permitting movement of said one member away from said first position and the release of said end member from said box, said blocking member comprising an end of said box which defines a T-shaped opening, and said end member comprising transverse projecting means located in the box in abutment against the portion of said box end defining the stem of said T-shaped opening when said members are in said first relative position, said projecting means being dimensioned to pass through the transverse part of said T-shaped opening when said strap end is moved from said first position to a second position in which said projecting means is in alignment with said transverse part.

4. Device for connecting two strap sections, at least one of which terminates in an end member, said device being adapted to permit the automatic separation of said sections and comprising:
    a box receiving said end member;
    a blocking member blocking release of said end member when said blocking member and end member are in a first position relative to each other but permitting the release of said end member when said members are in a second position relative to each other;
    spring means biasing one of said members away from said first relative position toward said second relative position, and
    at least one tablet positioned to prevent movement of said one member away from said first relative position, said at least one tablet being adapted to disintegrate in response to predetermined ambient conditions, thereby permitting movement of said one member away from said first position and the release of said end member from said box, said box being provided at one end with a slot for receiving said end member, which end member defines a hole passing therethrough, and said blocking member being a pin attached to a plate located inside the box and pivotally mounted near the other end of the box, said plate being gripped between said at least one tablet and said spring means so that in the first position of said end member said pin traverses said hole, but when said at least one tablet disintegrates, the spring means automatically lifts the plate and releases the pin from the hole in the end of the end member, thus releasing the end member from the box.

5. Device as claimed in claim 4 in which said slot has dimensions equal to or slightly greater than those of said end member in order to avoid any gripping during release of said end member.

6. Device according to claim 4 in which the bottom of the box is provided with a hole so positioned that when a tablet and the strap end having a hole therein are in place in the box, the pin fixed to the plate passes through the strap end and the bottom of the box.

* * * * *